(12) United States Patent
Sugimura et al.

(10) Patent No.: US 10,268,406 B2
(45) Date of Patent: Apr. 23, 2019

(54) INFORMATION STORAGE DEVICE, INFORMATION STORAGE SYSTEM, AND INFORMATION STORAGE CONTROL PROGRAM

(71) Applicant: NIKON CORPORATION, Tokyo (JP)

(72) Inventors: Takeaki Sugimura, Yokohama (JP); Kazuyuki Kazami, Tokyo (JP); Atsushi Tanaka, Fuchu (JP); Soichiro Tsuboi, Tokyo (JP); Genshi Yoshioka, Tokyo (JP); Daisuke Yuki, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/382,417

(22) Filed: Dec. 16, 2016

(65) Prior Publication Data

US 2017/0139630 A1     May 18, 2017

Related U.S. Application Data

(63) Continuation of application No. PCT/JP2015/067168, filed on Jun. 15, 2015.

(30) Foreign Application Priority Data

Jun. 20, 2014  (JP) ................................ 2014-127004

(51) Int. Cl.
*G06F 3/00*      (2006.01)
*G06F 3/06*      (2006.01)
(Continued)

(52) U.S. Cl.
CPC .......... *G06F 3/0629* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 7,298,805 B2 * 11/2007 Walton ............... H04B 1/71072
375/347
9,535,625 B2 *  1/2017 Raciborski ............ G06F 3/0608
(Continued)

FOREIGN PATENT DOCUMENTS

JP       2003-248607 A    9/2003
JP       2005-267569 A    9/2005
(Continued)

OTHER PUBLICATIONS

Sep. 1, 2015 International Search Report issued in International Patent Application No. PCT/JP2015/067168.
(Continued)

*Primary Examiner* — Midys Rojas
(74) *Attorney, Agent, or Firm* — Oliff PLC

(57) ABSTRACT

An information storage device is a device that communicates over a network with another device that is used by another user different from an own user who uses an own device, and includes a storage unit including a first storage area available to the own user and a second storage area available to the other user, an information output unit that outputs information of the own user stored in the first storage area to the other device over the network, an information writing unit that stores information of the other user output by the other device over the network, in the second storage area, and a use control unit that controls whether the second storage area is available to the own user on the basis of an instruction of the other user.

10 Claims, 10 Drawing Sheets

(51) Int. Cl.
*G06F 21/62* (2013.01)
*G06F 12/14* (2006.01)
*G06F 21/10* (2013.01)

(52) U.S. Cl.
CPC .......... *G06F 3/0622* (2013.01); *G06F 3/0637* (2013.01); *G06F 12/1441* (2013.01); *G06F 12/1483* (2013.01); *G06F 21/10* (2013.01); *G06F 21/62* (2013.01); *G06F 21/6218* (2013.01); *G06F 2212/1056* (2013.01)

(56) References Cited

U.S. PATENT DOCUMENTS

| | | |
|---|---|---|
| 2005/0210193 A1 | 9/2005 | Nagata |
| 2005/0210209 A1 | 9/2005 | Nagata |
| 2005/0210210 A1 | 9/2005 | Arai et al. |
| 2008/0133857 A1 | 6/2008 | Arai et al. |

FOREIGN PATENT DOCUMENTS

| | | |
|---|---|---|
| JP | 2005-301824 A | 10/2005 |
| JP | 2006-227928 A | 8/2006 |

OTHER PUBLICATIONS

Sep. 1, 2015 Written Opinion of the International Searching Authority issued in International Patent Application No. PCT/JP2015/067168.
Sep. 19, 2017 Office Action issued in Japanese Patent Application No. 2016-529327.

\* cited by examiner

| USER ID | USER NAME | ... |
|---------|-----------|-----|
| U001 | A | ... |
| U002 | B | ... |
| U003 | C | ... |
| U004 | D | ... |
| U005 | E | ... |
| ... | ... | ... |

FIG. 5

| RECORD NUMBER | ACCESS RIGHT | OWNER | DATA CONTENT | ... |
|---|---|---|---|---|
| R100 | A | A | ○△□... | ... |
| R101 | A | A | ○△□... | ... |
| R102 | A | A | ○△□... | ... |
| R103 | A | A | ○△□... | ... |
| R104 | A | A | ○△□... | ... |
| ... | ... | ... | ... | ... |

FIG. 6

| RECORD NUMBER | ACCESS RIGHT | OWNER | DATA CONTENT | ... |
|---|---|---|---|---|
| R200 | B | B | ○△□... | ... |
| R201 | B | B | ○△□... | ... |
| R202 | B | B | ○△□... | ... |
| R203 | B | B | ○△□... | ... |
| R204 | B | B | ○△□... | ... |
| ... | ... | ... | ... | ... |
| R220 | B | NONE | NONE | ... |
| R221 | B | NONE | NONE | ... |
| R222 | B | NONE | NONE | ... |
| ... | ... | ... | ... | ... |

| RECORD NUMBER | ACCESS RIGHT | OWNER | DATA CONTENT | ... |
|---|---|---|---|---|
| R200 | B | B | ○△□··· | ... |
| R201 | B | B | ○△□··· | ... |
| R202 | B | B | ○△□··· | ... |
| R203 | B | B | ○△□··· | ... |
| R204 | B | B | ○△□··· | ... |
| ... | ... | ... | ... | ... |
| R220 | A | A | ○△□··· | ... |
| R221 | A | A | ○△□··· | ... |
| R222 | A | A | ○△□··· | ... |
| ... | ... | ... | ... | ... |

FIG. 10

| USER ID | USER NAME | ATTRIBUTE | | ... |
| --- | --- | --- | --- | --- |
| | | FRIEND | FAMILY | |
| U001 | A | B, C | B | ... |
| U002 | B | A, C | A | ... |
| U003 | C | A, B | NONE | ... |
| U004 | D | E | NONE | ... |
| U005 | E | D | NONE | ... |
| ... | ... | ... | ... | ... |

INFORMATION STORAGE DEVICE, INFORMATION STORAGE SYSTEM, AND INFORMATION STORAGE CONTROL PROGRAM

CROSS-REFERENCE TO RELATED APPLICATION

This is a Continuation Application of International Application No. PCT/JP2015/067168, filed on Jun. 15, 2015, which claims priority to Japanese Patent Application No. 2014-127004, filed Jun. 20, 2014, the contents of which are incorporated herein by reference.

BACKGROUND

Field of the Invention

The present invention relates to an information storage device, an information storage system, and an information storage control program.

Description of the Related Art

In recent years, various information storage systems have been known. For example, Japanese Unexamined Patent Application, First Publication No. 2005-267569 (hereinafter, Patent Literature 1) describes an information storage system capable of backing up data by transferring the data to a plurality of information storage devices.

SUMMARY

However, in the technology described in Patent Literature 1, a storage unit included in each information storage device is dedicated to backup and may not be used for other purposes in some cases. That is, there is a case where the technology described in Patent Literature 1 cannot increase the flexibility of utility forms of the storage unit. An object of an aspect according to the present invention is to provide an information storage device, an information storage system, and an information storage control program capable of improving flexibility of use of a storage unit.

An aspect of an information storage device according to the present invention is an information storage device that communicates with another device that is used by another user different from an own user who uses an own device, the information storage device including: a storage unit including a first storage area available to the own user and a second storage area available to the other user; an information output unit that outputs information of the own user stored in the first storage area to the other device over the network; an information writing unit that stores information of the other user output by the other device over the network, in the second storage area of the own device; and a use control unit that controls whether the second storage area is available to the own user on the basis of an instruction of the other user.

An aspect of an information storage system according to the present invention is an information storage system in which a first device used by a first user and a second device used by a second user different from the first user communicate over a network, wherein the first device includes a first storage unit including a first storage area available to the first user and a second storage area available to the second user; a first information output unit that outputs the information of the first user stored in the first storage area to the second device over the network; a first information writing unit that stores information of the second user output by the second device over the network, in the second storage area; and a use control unit that controls whether the second storage area is available to the first user on the basis of an instruction of the second user, and the second device includes a second storage unit including a third storage area available to the second user and a fourth storage area available to the first user; a second information output unit that outputs information of the second user stored in the third storage area to the first device over the network; and a second information writing unit that stores information of the first user output by the first device over the network, in the fourth storage area.

An aspect of an information storage control program according to the present invention causes a computer included in a device comprising a storage unit including a first storage area available to an own user using the own device, and a second storage area available to another user different from the own user, and communicating with another device used by the other user over a network to execute: an information output step of outputting information of the own user stored in the first storage area to the other device over the network; an information writing step of storing information of the other user output by the other device over the network, in the second storage area of the own device; and a use control step of controlling whether the second storage area is available to the own user on the basis of an instruction of the other user.

According to an aspect of the present invention, it is possible to increase the flexibility of utility forms of the storage unit.

BRIEF DESCRIPTION OF DRAWINGS

FIG. 5 is a table showing an example of information stored in a first storage area of the embodiment.

FIG. 6 is a table showing an example of information stored in a second storage area of the embodiment.

FIG. 10 is a diagram illustrating an example of an attribute information table according to this embodiment.

DESCRIPTION OF EMBODIMENTS

First Embodiment

Hereinafter, embodiments of the present invention will be described in detail with reference to the drawings.

Figure 1:
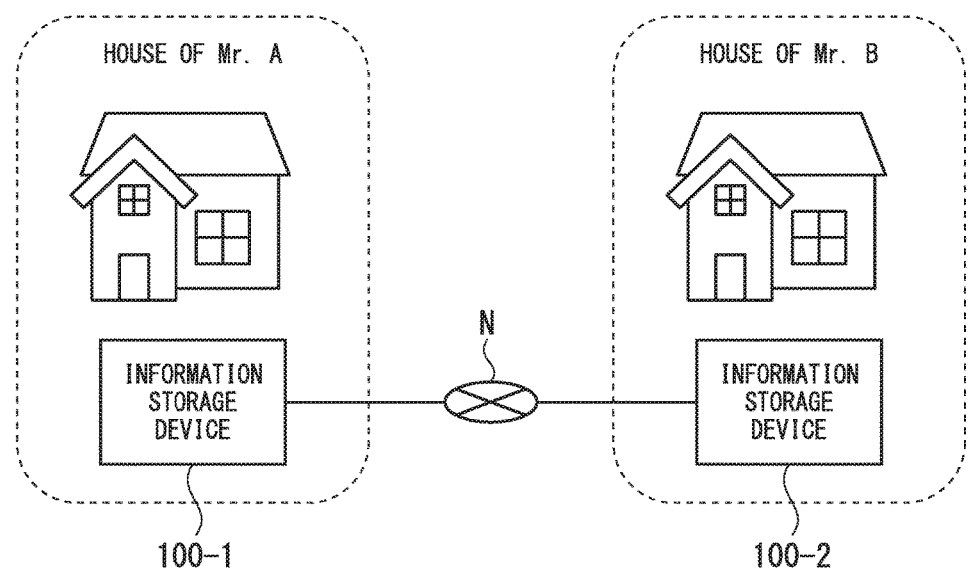
FIG. 1 is a schematic diagram illustrating an example of an information storage system according to an embodiment of the present invention.

FIG. 1 is a schematic diagram illustrating an example of an information storage system 1 according to an embodiment of the present invention. This information storage system 1 includes a plurality of information storage devices 100. The plurality of information storage devices 100 are connected over a network N. Here, the network N may be a dedicated line or a public line. For example, the network N may be the Internet. Here, a case in which the information storage device 100-1 (first information storage device) disposed in a house of Mr. A and the information storage device 100-2 (second information storage device) disposed in a house of Mr. B are connected over the network N will be described by way of example. Mr. A and Mr. B are users of the information storage system 1. In the following description, Mr. A will be also described as user A, and Mr. B will be described as user B. Further, on the basis of user A, user A is also described as the own user, and user B is described as the other user. Further, on the basis of the information storage device 100-1 disposed in a house of user A, the information storage device 100-1 is also described as the own device, and the information storage device 100-2 is also described as the other device.

Figure 2:
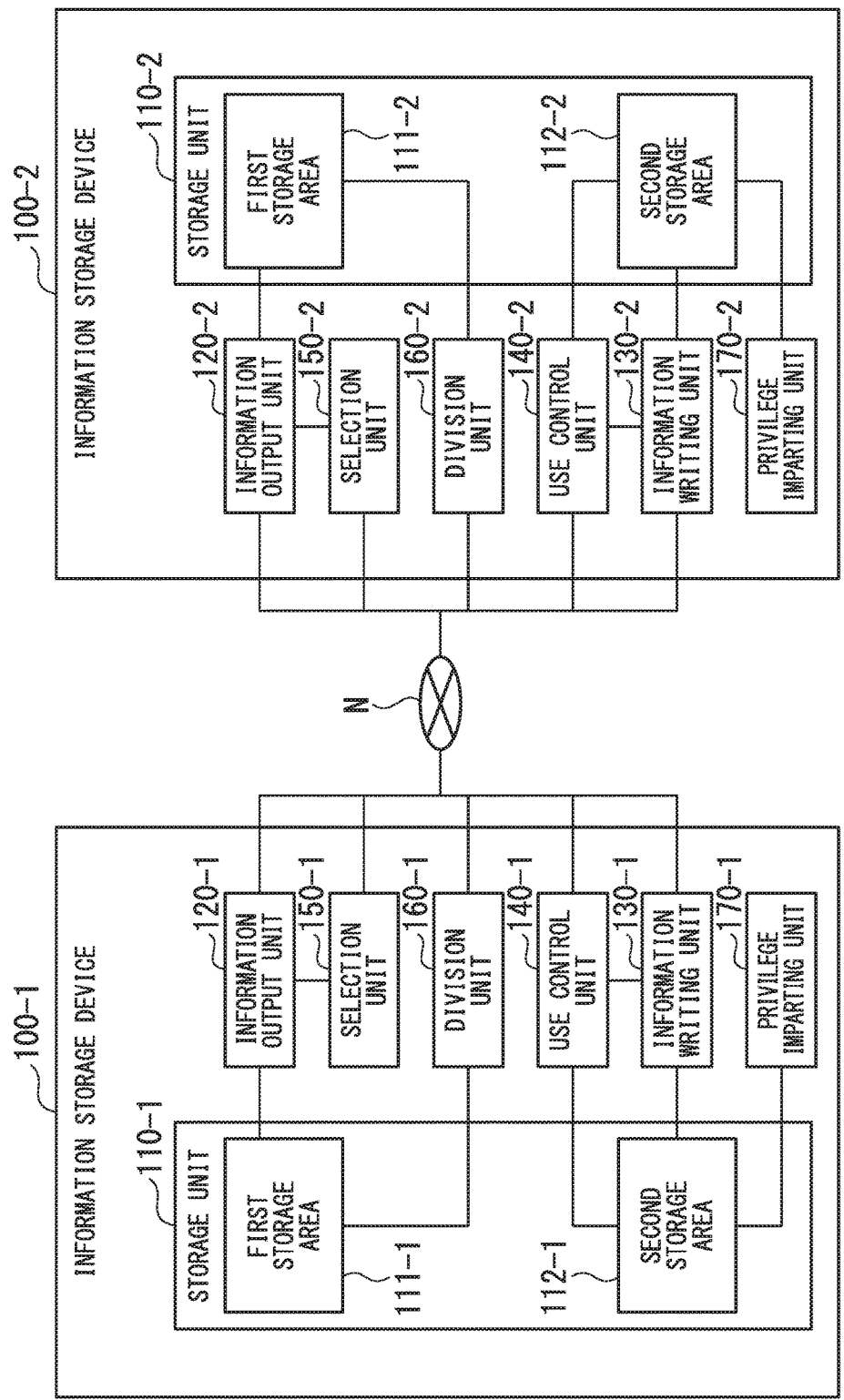
FIG. 2 is a block diagram illustrating an example of an information storage system according to this embodiment.

FIG. 2 is a block diagram illustrating an example of the information storage system 1 according to this embodiment. Here, the information storage device 100-1 will be described as an information storage device 100. For example, a storage unit 110-1 included in the information storage device 100-1 will be described as a storage unit 110. In this example, the information storage device 100-1 and the information storage device 100-2 have the same configuration. Therefore, description of the information storage device 100-2 will be omitted.

The information storage device 100 includes a storage unit 110, an information output unit 120, an information writing unit 130, a use control unit 140, a selection unit 150, a division unit 160, and a privilege imparting unit 170. In the first embodiment, the storage unit 110, the information output unit 120, the information writing unit 130, and the use control unit 140 among the above units will be described. The selection unit 150, the division unit 160, and the privilege imparting unit 170 will be described in a second embodiment to be described below. Further, the information storage device 100 according to the first embodiment does not necessarily include the selection unit 150, the division unit 160, and the privilege imparting unit 170.

The storage unit 110 includes a storage device such as a hard disk drive (HDD) or a storage element such as a semiconductor memory. The storage unit 110 temporarily stores a calculation result from each unit of the information storage device 100. Further, the storage unit 110 stores information such as a data table that is used for calculation in each unit of the information storage device 100. The user information table stored in the storage unit 110 will be described with reference to FIG. 3.

Figures 3, 4A:
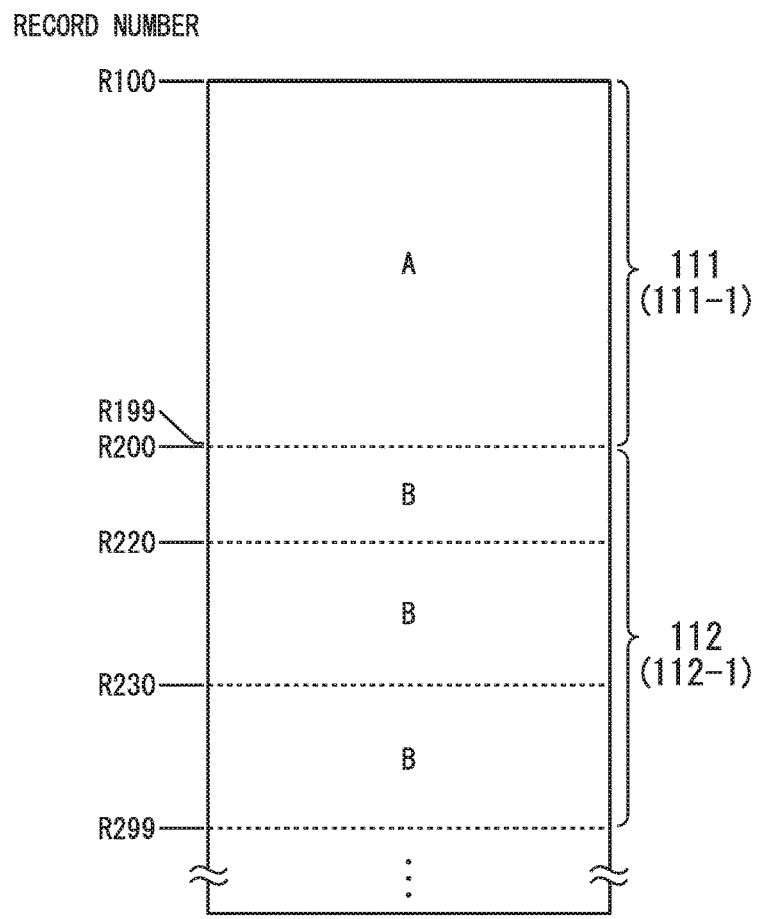
FIG. 3 is a diagram illustrating an example of a user information table stored in a storage unit according to the embodiment.
FIG. 4A is a schematic diagram illustrating an example of a storage area of the storage unit of the embodiment.

FIG. 3 is a diagram illustrating an example of a user information table stored in the storage unit 110 according to this embodiment. The storage unit 110 stores a user ID and a user name in association with each other as a user information table. Here, the user ID is information for identifying a user who uses the information storage system 1. Further, the user name is a name, a nickname, or the like of the user who uses the information storage system 1. Specifically, the storage unit 110 stores user ID "U001" and username "A" in association with each other. In this case, the user ID of user A (Mr. A) is shown as "U001". Similarly, the storage unit 110 stores user ID "U002" and user name "B" in association with each other and stores user ID "U003" and user name "C" in association with each other. Further, the storage unit 110 stores user ID "U004" and user name "D" in association with each other and stores user ID "U005" and user name "E" in association with each other.

In addition to the user ID and the user name, the storage unit 110 may store an attribute such as an age, sex, and address of the user and the user ID in association with each other as a user information table. Further, this user information table does not have to be stored in the information storage device 100 but may be stored in a server device (not illustrated) connected to the network N. Further, the storage unit 110 includes a first storage area 111 and a second storage area 112 as illustrated in FIGS. 4A and 4B.

Figure 4B:
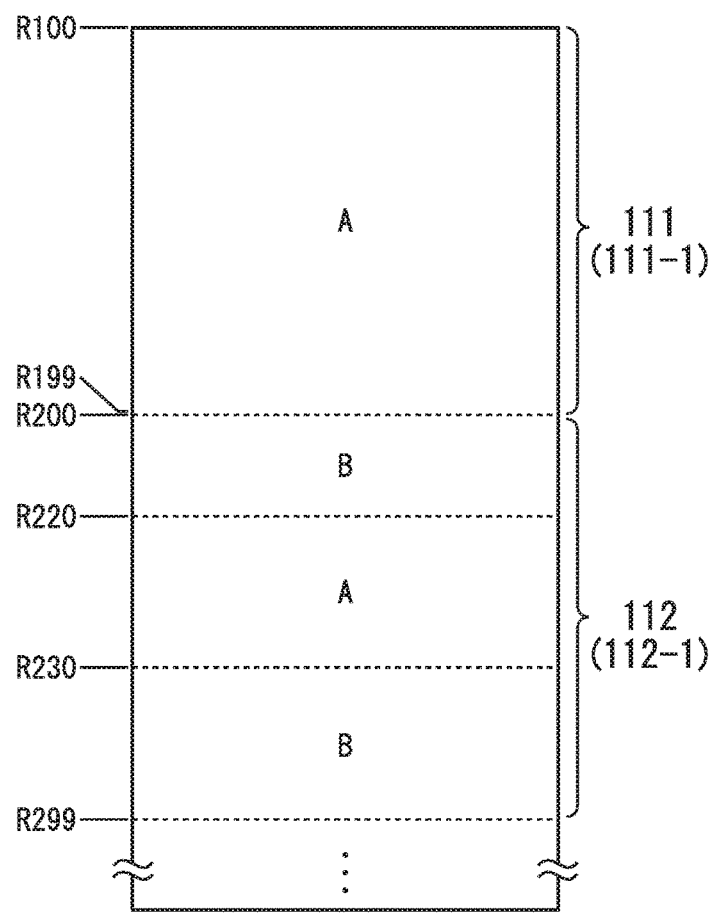
FIG. 4B is a schematic diagram illustrating an example of the storage area of the storage unit according to the embodiment.

FIGS. 4A and 4B are schematic diagrams illustrating an example of storage areas of the storage unit 110 of this embodiment. Hereinafter, configurations of the first storage area 111 and the second storage area 112 will be described with reference to FIGS. 4A and 4B to FIG. 7. The configurations of the first storage area 111 and the second storage area 112 may be different for each information storage device 100. In FIGS. 4A and 4B to FIG. 7, a first storage area 111-1 of the information storage device 100-1 will be described as the first storage area 111. Further, in FIGS. 4A and 4B, a second storage area 112-1 of the information storage device 100-1 will be described as the second storage area 112.

When the first storage area 111-1 of the information storage device 100-1 and the first storage area 111-2 of the information storage device 100-2 are particularly distinguished, the first storage area 111-2 is also described as a third storage area. Further, when the second storage area 112-1 of the information storage device 100-1 and the second storage area 112-2 of the information storage device 100-2 are particularly distinguished, the second storage area 112-2 is described as a fourth storage area.

In the following description, a case in which the storage unit 110 includes a storage area from a record number R100 to a record number R300 will be described by way of example. Here, the record is an example of an address representation indicating a position or a size of the storage area of the storage unit 110. As illustrated in FIG. 4A, the storage area from record number R100 to record number R199 in the storage unit 110 is the first storage area 111. Further, the storage area from record number R200 to record number R299 in the storage unit 110 is the second storage area 112.

A user that can perform write access and read access is assigned to each of the storage areas. That is, an access right is set for the user in each storage area. In the following description, the write access and the read access are collectively simply described as "access". Specifically, in the first storage area 111, an access right is set so that user A can access the first storage area 111. Therefore, only user A among users can access the first storage area 111. In the following description, "an access right is set so that user A can access the first storage area 111" is simply described as "the access right is set for user A". Next, a specific example of the information stored in each record of the first storage area 111 will be described with reference to FIG. 5.

FIG. 5 illustrates a table showing an example of information stored in the first storage area 111 of this embodiment. In the first storage area 111, a record number, an access right, an owner of data, and the data are associated and stored for each record. Specifically, record number R100, access right "A", owner "A", and data "o∆☐ . . . " are associated and stored. Here, access right "A" indicates that an access right is set so that user A can access the storage area. Further, owner "A" indicates that an owner of the data in this record is user A. Similar to record number R100, access right "A", owner "A", and data "o∆☐ . . . " are associated and stored for each of records from record number R101 to record number R104.

Referring back to FIG. 4A, the access right is set so that user B can access the storage area in the second storage area 112. That is, an access right is set for user B in the second storage area 112. Therefore, only user B among the users can access the second storage area 112. Next, a specific example of the information stored in each record of the second storage area 112 will be described with reference to FIG. 6.

FIG. 6 illustrates a table showing an example of information stored in the second storage area 112 of this embodiment. In the second storage area 112, a record number, an access right, an owner of data, and data are associated and stored for each record, similar to the first storage area 111. Specifically, record number R200, access right "B", owner "B", and data "o∆☐ . . . " are associated and stored in the second storage area 112. Here, access right "B" indicates that the access right is set so that user B can access the storage area. Further, owner "B" indicates that an owner of the data in this record is user B. Similar to record number R200, access right "B", owner "B", and data "o∆☐ . . . " are associated and stored for each record from the record number R201 until record number R204. Further, similar to record number R200, access right "B", owner "None", and data "None" are associated and stored for respective records from record number R220 to record number R222. Here, owner "None" indicates that the data is not owned by any user.

Further, data "None" indicates that data is not stored in the record. Further, owner "None" and data "None" indicate that the record is not used.

The storage unit 110 including the storage area (first storage area 111) available to the own user and the storage area (second storage area 112) available to the other user has been described above. That is, the storage unit 110 includes the first storage area 111 available to user A (own user) and the second storage area 112 available to user B (other user). Next, a mechanism that enables the second storage area 112 to be available to the own user, in addition to the second storage area 112 being available to the other user by changing the access right for the second storage area 112 will be described.

The access right for each storage area can be changed. A specific example of this change in access right will be described with reference to FIG. 4B and FIG. 7. As illustrated in FIG. 4B, for example, the access right set so that user B can access the storage area of record number R220 to record number R230 in the second storage area 112 can be changed so that user A can access the storage area.

Figures 7, 8:
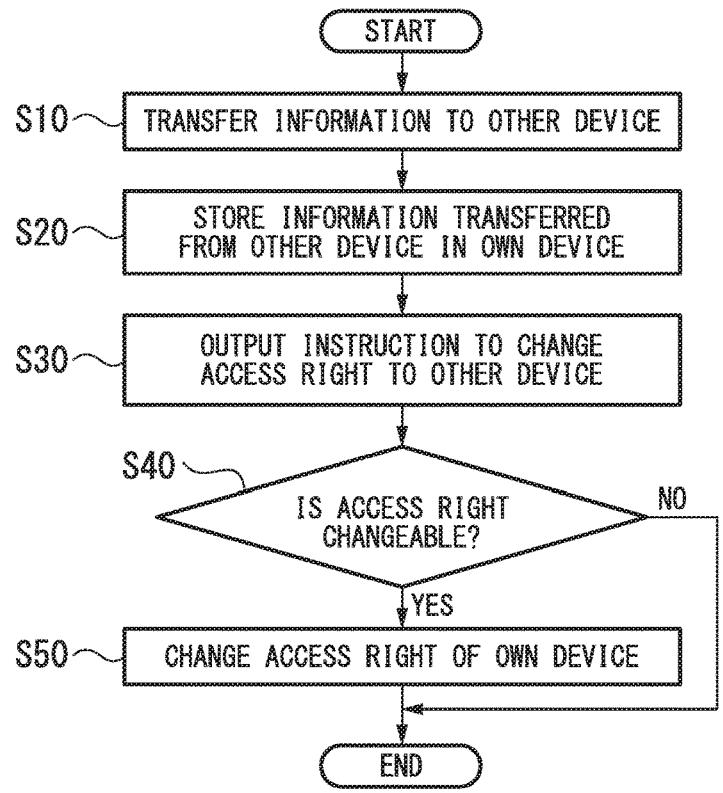
FIG. 7 is a table showing an example of information after access right change stored in the second storage area of the embodiment.
FIG. 8 is a flowchart illustrating an example of an operation of the information storage system according to the embodiment.

FIG. 7 illustrates a table showing an example of information after access right change stored in the second storage area 112 of this embodiment. In this example, a change from access right "B" to "A" occurs for respective records from record number R220 to record number R222 of the second storage area 112. Accordingly, a change from a state in which user B can access from a state in which user A can access the storage area occurs for the respective records from record number 8220 to record number R222 of the second storage area 112. Further, data of which an owner is user A is written to the respective records from record number R220 to record number R222 of the second storage area 112 due to a change to a state in which user A can access the storage area. Here, data "o∆☐ . . . " of which the owner is user A is assumed to be written to the respective records from record number R220 to record number R222. In this case, the respective records from record number R220 to record number R222 are changed from owner "None" to "A" and from data "None" to "o∆☐ . . . " and stored in the second storage area 112.

In this example, the access right has been described as being changeable for each record, but the present invention is not limited thereto. This access right is changeable in units of a plurality of records. Hereinafter, a configuration of the information storage system 1 that uses a mechanism of the storage unit 110 will be described with reference to FIG. 2.

Referring back to FIG. 2, the description of the configuration of the information storage system 1 will be continued. This information storage system 1 can divide and store information owned by a certain user in the plurality of information storage devices 100. A case in which user A uses the information storage device 100-1 and user B uses the information storage device 100-2 in this information storage system 1 will be described by way of example. The information storage device 100-1 includes a storage area (first storage area 111-1) available to the own user (that is, user A) and a storage area (second storage area 112-1) available to another user (that is, user B). Further, the information storage device 100-2 includes a storage area (first storage area 111-2) available to the own user (that is, user B) and a storage area (second storage area 112-2) available to the other user (that is, user A). In this information storage system 1, the information storage device 100-1 transfers the information of user A stored in the own device to the information storage device 100-2 over the network N. The information storage device 100-2 stores the transferred information in the storage area (second storage area 112-2) available to user A.

Thus, the information storage system 1 divides and stores the information owned by user A in the information storage device 100-1 and the information storage device 100-2. Accordingly, the information storage system 1 has the following effects. First, when the amount of information owned by user A increases and a storage capacity is insufficient in the information storage device 100-1 alone, the information of user A can be stored using an available storage area of the information storage device 100-2. Further, the information owned by user A may be stored in duplicate in the information storage device 100-1 and the information storage device 100-2, thereby preventing information from being lost when any one of the devices fails. Further, user A may visit a house of user B and use the information of user A. In this case, user A operates the information storage device 100-2. When the information of user A is not stored in the information storage device 100-2, the information storage system 1 transfers the information of user A from the information storage device 100-1 to the information storage device 100-2 over the network N. Accordingly, user A can use information of user A by operating the information storage device 100-2. Further, prior to use of the information storage device 100-2 by user A, the information storage system 1 can transfer the information of user A from the information storage device 100-1 to the information storage device 100-2 in advance. Accordingly, user A can use the information of user A without worrying about a transfer delay due to the network N. A configuration of the information storage system 1 for realizing the above-described functions will be described.

The information output unit 120 outputs the information of the own user stored in the first storage area 111 to the other device over the network N. This information output unit 120 includes a memory controller, and reads information from the storage unit 110. Further, the information output unit 120 includes a network controller, and transmits the information read from the storage unit 110 to another information storage device 100 over the network N.

Hereinafter, an example in which the own device is the information processing device 100-1 and the other device is the information storage device 100-2 will be described. In this case, the own user is a user (here, user A) of the information storage device 100-1. The information output unit 120-1 of the information storage device 100-1 reads information from the storage unit 110-1. In this case, the information output unit 120-1 reads information from the first storage area 111-1 by setting the record number of the read access to a record number indicating the first storage area 111-1. In an example of this embodiment, a record number indicating the first storage area 111-1 ranges from record number R100 to record number R199 (see FIG. 4A). Further, the information output unit 120-1 of the information storage device 100-1 transmits the information read from the storage unit 110-1 to the information storage device 100-2 over the network N. Thus, the information output unit 120-1 of the information storage device 100-1 transfers the information stored in the information storage device 100-1 to the information storage device 100-2.

The information output unit 120-2 of the information storage device 100-2 has the same configuration as the information output unit 120-1, but differs from the information output unit 120-1 of the information storage device 100-1 in the following points. That is, the information output unit 120-2 is different from the information output unit 120-1 in that an information readout target is the first storage area 111-2 of the information storage device 100-2 and a transmission destination of the read information is the information storage device 100-1. Since this information output unit 120-2 is the same as the above-described information output unit 120-1 in other points, description thereof will be omitted. In the first storage area 111-2 of the information storage device 100-2, information of the other user (in this example, user B) is stored. The information output unit 120-2 reads the information of user B from the storage unit 110-2. Further, the information output unit 120-2 transmits the information read from the storage unit 110-2 to the information storage device 100-1 over the network N. Thus, the information output unit 120-2 of the information storage device 100-2 transfers the information stored in the information storage device 100-2 to the information storage device 100-1.

The information writing unit 130 writes the information of another user that the other device has output over the network N, to the second storage area 112 to store the information. In an example of this embodiment, the information writing unit 130-1 of the information storage device 100-1 writes the information of user B that the information storage device 100-2 has output over the network N, to the second storage area 112-1. In this case, the information writing unit 130-1 writes the information to the second storage area 112-1 by setting a record number of write access to a record number indicating the second storage area 112-1. In an example of this embodiment, the record number indicating the second storage area 112-1 ranges from record number R200 to record number R299 (see FIG. 4A). Accordingly, the information of user B is distributed and stored in the information storage device 100-1 and the information storage device 100-2.

The information writing unit 130-2 of the information storage device 100-2 has the same configuration as the information writing unit 130-1, but is different from the information writing unit 130-1 of the information storage device 100-1 in the following points. That is, the information writing unit 130-2 differs from the information writing unit 130-1 in a point where a transmission source of received information is the information storage device 100-1 and a received information writing target is the second storage area 112-2 of the information storage device 100-2. Since this information output unit 120-2 is the same as the above-described information output unit 120-1 in the other points, description thereof will be omitted. Further, the information writing unit 130-2 of the information storage device 100-2 writes the information of user A that the information storage device 100-1 has output over the network N, to the second storage area 112-2 of the information storage device 100-2.

Next, the use control unit 140 will be described. The second storage area 112 is made available to the own user in addition to other users by changing the access right, as described above. The use control unit 140 controls this access right. This use control unit 140 can perform readout-access to the second storage area 112. Before changing the access right, the second storage area 112 is available to only the other user. When the use control unit 140 receives an instruction to cause the second storage area 112 to be available to the own user from the other user, the use control unit 140 changes the access right from the other user to the own user for some (or all) of the records of the second storage area 112. Accordingly, the own user can use the second storage area 112, in addition to the first storage area 111 of the own device. That is, the use control unit 140 controls whether or not the second storage area 112 is available to the own user on the basis of an instruction of the other user. Next, a mechanism for changing an access right in the use control unit 140 in an example of this embodiment will be described in detail.

The information storage device 100-2 transmits an instruction to change the access right to the information storage device 100-1 over the network N. In this example, the instruction to change the access right is an instruction to change the access right to some (or all) of the records of the second storage area 112-1 of the information storage device 100-1 from user B to user A. This instruction to change the access right includes information (record number information) indicating the number of records that are targets of the access right change. When the use control unit 140-1 of the information storage device 100-1 receives an instruction to change the access right from the information storage device 100-2, the use control unit 140-1 determines whether the access right is allowed to be changed. Specifically, the use control unit 140-1 determines whether the access right is allowed to be changed by determining whether the number of records indicated by the record number information can be secured in the second storage area 112-1.

More specifically, the use control unit 140-1 acquires the record number information included in the instruction to change the access right. Further, the use control unit 140-1 counts the number of available records of the second storage area 112-1. Here, the use control unit 140-1 accesses the second storage area 112-1 and counts records (that is, available records) of which an owner is "none" among the plurality of records of the second storage area 112. Further, the use control unit 140-1 compares the number of records for which the access right is to be changed, which is indicated by the record number information, with the counted number of available records, and determines that the access right is allowed to be changed when the number of records for which the access right is to be changed is equal to or smaller than the number of available records. When the use control unit 140-1 determines that the access right is allowed to be changed, the use control unit 140-1 changes the access right for the available records from user B to user A. In the example described with reference to FIGS. 6 and 7, the use control unit 140-1 changes the access right for each of available records from record number R220 to record number R222 from user B to user A. Thus, user A can use the second storage area 112-1, in addition to the first storage area 111-1 of the information storage device 100-1. That is, in the information storage system 1, it is possible to improve flexibility of a use aspect of each storage area of each information storage device 100.

<Operation of Information Storage System 1>

FIG. 8 is a flowchart illustrating an example of an operation of the information storage system 1 according to this embodiment. The information output unit 120 reads the information from the first storage area 111 of the own device and outputs the read information to the other device over the network N (step S10). Specifically, the information output unit 120-1 of the information storage device 100-1 reads the information from the first storage area 111-1 and outputs the read information to the information storage device 100-2 over the network N. Here, the information output unit 120-2 of the information storage device 100-2 may read information from the first storage area 111-2 and output the read information to the information storage device 100-1 over the network N.

The information writing unit 130 writes and stores the information received from the other device over the network N to and in the second storage area 112 of the own device (step S20). Specifically, the information writing unit 130-1 of the information storage device 100-1 writes and stores the information received from the information storage device 100-2 over the network N to and in the second storage area 112-1 of the information storage device 100-1. Here, the information writing unit 130-2 of the information storage device 100-2 may write and store the information received from the information storage device 100-1 over the network N to and in the second storage area 112-2 of the information storage device 100-2.

The use control unit 140 outputs an instruction to change the access right to the other device over the network N (step S30). Specifically, the use control unit 140-1 of the information storage device 100-1 transmits the indication to change the access right to the information storage device 100-2 over the network N.

Here, the use control unit 140-2 of the information storage device 100-2 may transmit an instruction to change the access right to the information storage device 100-1 over the network N.

The use control unit 140 determines whether or not the access right is changeable (step S40). Specifically, the use control unit 140-1 of the information storage device 100-1 compares the number of records for which change of access right has been requested with the number of records for which the access right is changeable in the second storage area 112-1 of the own device. The use control unit 140-1 determines that the access right is changeable when the number of records for which changing the access right has been requested is equal to or smaller than the number of changeable records. Further, the use control unit 140-1 determines that the access right is not changeable when the number of records for which changing the access right has been requested exceeds the number of changeable records. In a case where the use control unit 140 determines that the access right is changeable (step S4: Yes), the process proceeds to step S50. The use control unit 140 ends the process when the access right is determined not to be changeable (step S40: No).

Here, the use control unit 140-2 of the information storage device 100-2 may determine whether the access right is changeable, similar to the use control unit 140-1.

The use control unit 140 changes an access right for the second storage area 112 of the own device from the other user to the own user (step S50). Specifically, the use control unit 140-1 of the information storage device 100-1 changes an access right for the second storage area 112-1 of the information storage device 100-1 from user B to user A on the basis of a received instruction to change an access right. Here, the use control unit 140-2 of the information storage device 100-2 may change an access right for the second storage area 112-2 of the information storage device 100-2 from user A to user B on the basis of the received instruction to change an access right.

As described above, in the information storage system 1 of this embodiment, the plurality of information storage devices 100 mutually store the information of the users using the other information storage devices 100. Further, the information storage system 1 includes the use control unit 140 which switches users of the storage areas of the information storage device 100. Accordingly, in the information storage system 1, since an information storage destination can be selected from the own device and the other device, it is possible to improve flexibility of a use aspect of each storage area of the information storage device 100.

In the information storage system 1, a plurality of information storage devices 100 have been described as being connected to each other over the network N, but the present invention is not limited thereto. In the information storage system 1, the plurality of information storage devices 100 may be directly connected not over the network N. That is, the information storage system 1 may have a configuration in which the plurality of information storage devices 100 are connected in a peer-to-peer manner.

Second Embodiment

Hereinafter, a second embodiment of the present invention will be described with reference to the accompanying drawings. The same configurations and operations as those in the first embodiment described above are denoted with the same reference numerals, and description thereof will be simplified or omitted.

Figure 9:
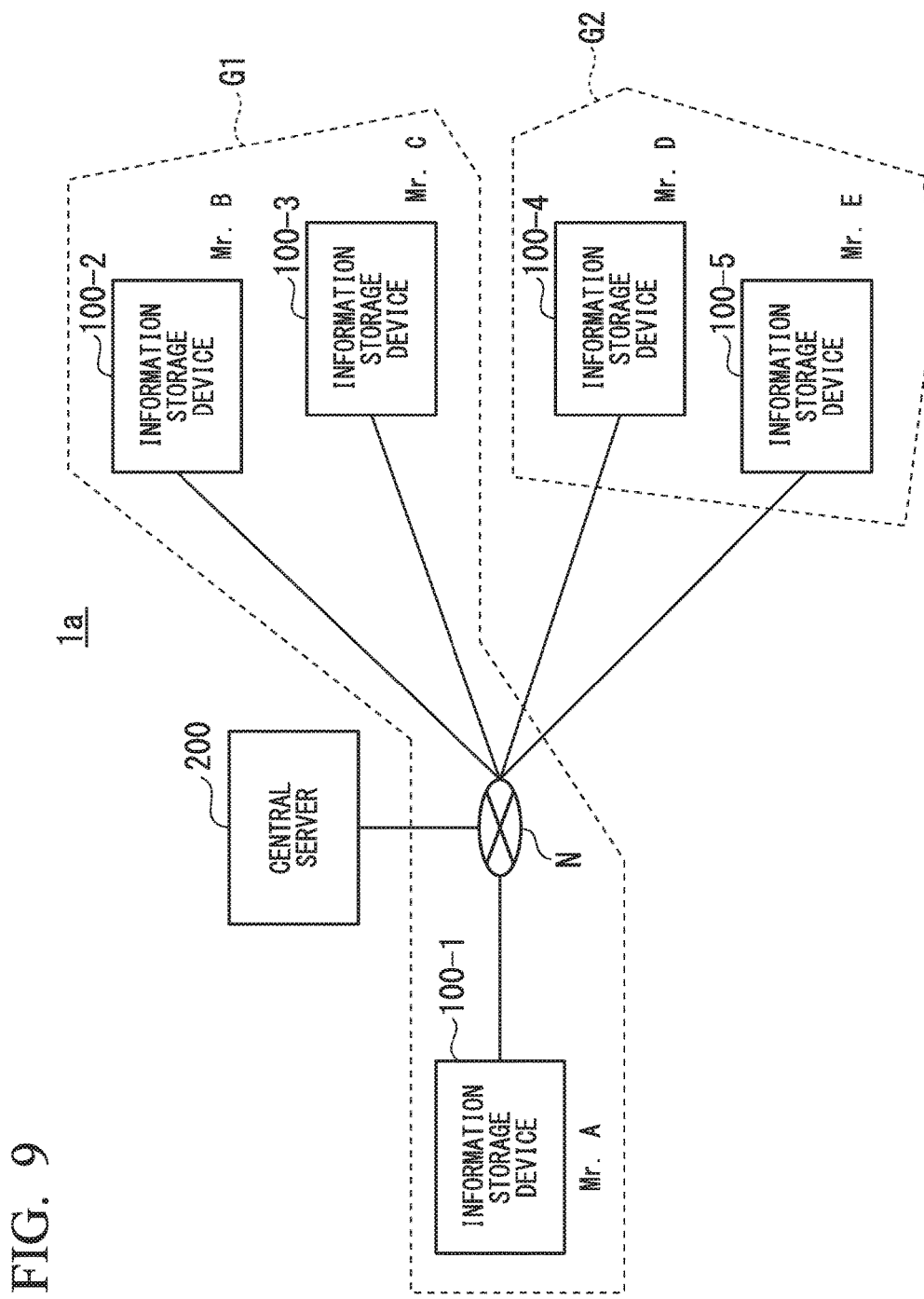
FIG. 9 is a schematic diagram illustrating an example of an information storage system according to a second embodiment.

FIG. 9 is a schematic diagram illustrating an example of an information storage system 1a according to the second embodiment. The information storage system 1a differs from the information storage system 1 of the first embodiment in that a central server 200 and a plurality of information storage devices 100 are connected over a network N.

The information storage system 1a includes an information storage device 1001 disposed in a house of user A (Mr. A), an information storage device 100-2 disposed in a house of user B (Mr. B), and an information storage device 100-3 disposed in a house of user C (Mr. C). Further, the information storage system 1a includes an information storage device 100-4 disposed in a house of user D (Mr. D), and an information storage device 100-5 disposed in a house of user E (Mr. E). Since the information storage devices 100-1 to 100-5 have the same configuration, the information storage device 100-1 will be described and description of the other information storage devices 100 will be simplified or omitted. Further, the information storage system 1a includes the central server 200. The central server 200 includes a storage unit (not illustrated) that stores an attribute information table indicating attributes of each user. In this example, a case in which the attribute information table is stored in the central server 200 will be described, but the present invention is not limited thereto. For example, the attribute information table may be stored in any of the information storage devices 100. An example of the attribute information table will be described with reference to FIG. 10.

FIG. 10 is a diagram illustrating an example of the attribute information table of this embodiment. The storage unit of the central server 200 stores a user ID and a user name, and attributes in association with each other as an attribute information table. These attributes include information indicating a relationship between the users. Specifically, the attributes include information indicating whether or not the users have a friend relationship, and information indicating whether or not the users have a family relationship. Here, the relationship between users may be a real relationship or may be a relationship in a virtual world such as a social networking service (SNS). For example, this friend may be a "friend" associated in the SNS.

In this example, a user (user A) having a user ID of "U001" has a friend relationship with users B and C and a family relationship with user B. Further, a user (user B) having a user ID of "U002" has a friend relationship with users A and C and a family relationship with user A. Further, a user (user C) having a user ID of "U003" has a friend relationship with users A and B and has no family relationship with any of the users. Further, a user (user D) having a user ID of "U004" has a friend relationship with user E and has no family relationship with any of the users. Further, a user (user E) having a user ID of "U005" has a friend relationship with user D and has no family relationship with any of the users. That is, in this example, users A and B have a friend relationship and a family relationship with each other. Further, users A, B, and C have a friend relationship with one another. Further, users D and E have a friend relationship with each other.

Referring back to FIG. 9, a group of information storage devices 100 will be described. Here, the group is a group of a plurality of information storage devices 100. The information storage devices 100 are grouped on the basis of attributes of users using the own devices. In an example described above, since users A, B, and C have a friend relationship, the information storage devices 100-1 to 100-3 that are used by these users are grouped into one group. Specifically, the information storage devices 100-1 to 100-3 are grouped into a group G1. Further, in the above-described example, since users D and E have a friend relationship with each other, the information storage devices 100-4 to 100-5 that are used by the users are grouped into one group. Specifically, the information storage devices 100-4 to 100-5 are grouped into a group G2. Here, the family relationship is a relationship in which a degree of association is higher than in the friend relationship. Further, a degree of association between users having a family relationship or a friend relationship is higher than a degree of association between users who do not have such relationships. That is, a plurality of information storage devices 100 are previously divided into a plurality of device groups on the basis of a degree of association of attributes of other users with the attributes of the own user. The information storage device 100 of this embodiment selects a transmission destination (output destination) of information on the basis of this group.

In this example, the case in which the information storage devices 100 are divided into a plurality of device groups in advance on the basis of the attributes of the other users and the attributes of the own user has been described, but the present invention is not limited thereto. The information storage device 100 may include a division unit 160 that divides the information storage devices 100 into a plurality of device groups on the basis of the attribute of the other users and the attribute of the own user. Hereinafter, the selection unit 150 (see FIG. 2) included in the information storage device 100 will be described.

The selection unit 150 acquires the attribute information of the attribute information table stored in the central server 200 over the network N. Further, the selection unit 150 selects the information storage device 100 that is an information transmission destination from among the plurality of information storage devices 100 on the basis of the attribute of the own user and the attribute of the other users indicated by the acquired attribute information. That is, the selection unit 150 selects another device that is an information output destination of the own user from among the plurality of other devices on the basis of the attribute of the other users and the attribute of the own user. More specifically, the selection unit 150 selects a device group that is an information output destination of the own user from among a plurality of device groups on the basis of the attribute of the other users and the attribute of the own user.

In the case of a specific example described above, the selection unit 150-1 of the information storage device 100-1 that is used by user A selects the information storage device 100 of the user having a friend relationship with the user (user A) of the own device, as the information transmission destination. Specifically, the selection unit 150-1 selects the information storage device 100-2 that is used by user B and the information storage device 100-3 that is used by user C as the information transmission destination. That is, the selection unit 150-1 selects the information storage devices 100 belonging to the group G1 as an information transmission destination. Further, in the case of the above-described specific example, a selection unit 150-4 (not illustrated) of the information storage device 100-4 that is used by user D selects the information storage device 100-5 of user E having a friend relationship with the user (user D) of the own device as an information transmission destination. In other words, the selection unit 150 selects a device group in which the degree of association of attributes of other users with the attribute of the own user is high, as the device group that is an information output destination of the own user.

Further, in this embodiment, the information output unit 120 outputs the information of the own user stored in the first storage area 111 to another device selected by the selection unit 150 over the network N.

More specifically, the information output unit 120 outputs the information of the own user stored in the first storage area 111 to another device included in a device group selected by the selection unit 150 over the network N. Thus, in the information storage system 1a, since the selection unit 150 selects an information transmission destination on the basis of the attribute of the user, it is possible to share information between users with a relationship.

A case in which the information storage device 100 shares digital photo data will be described as a specific example. The digital photo data includes data captured by a family or data captured by friends. As described above, in the information storage system 1a, the selection unit 150 selects the information storage device 100 that is an information transmission destination among the users having a relationship of "Friend". Therefore, digital photo data captured by friends can be shared in the information storage devices 100 in a group in which the friends have a relationship of "Friend". Thus, for example, users A, B, and C can view digital photo data captured by friends using the own information storage devices 100. Here, "friend" or "family" has been described as an example of a user grouping condition, but the present invention is not limited thereto. For example, users having the same hobbies or interests may be grouped into the same group.

Further, when the information storage device 100 includes the above-described division unit 160, the division unit 160 may be configured to divide the information of the own user on the basis of a degree of association of attributes of other users with the attribute of the own user. That is, the division unit 160 divides the information of the user stored in the information storage device 100 into a plurality of pieces of information. In this case, the information output unit 120 transmits (outputs) the divided information to the plurality of information storage devices 100 over the network N. That is, the information output unit 120 sets another device different for each information group after division as an output destination, and outputs the information group after division over the network N. Accordingly, the information storage system 1a can distribute and store one piece of information. An example of the distribution and storage of the information will be described with reference to FIG. 11.

Figure 11:
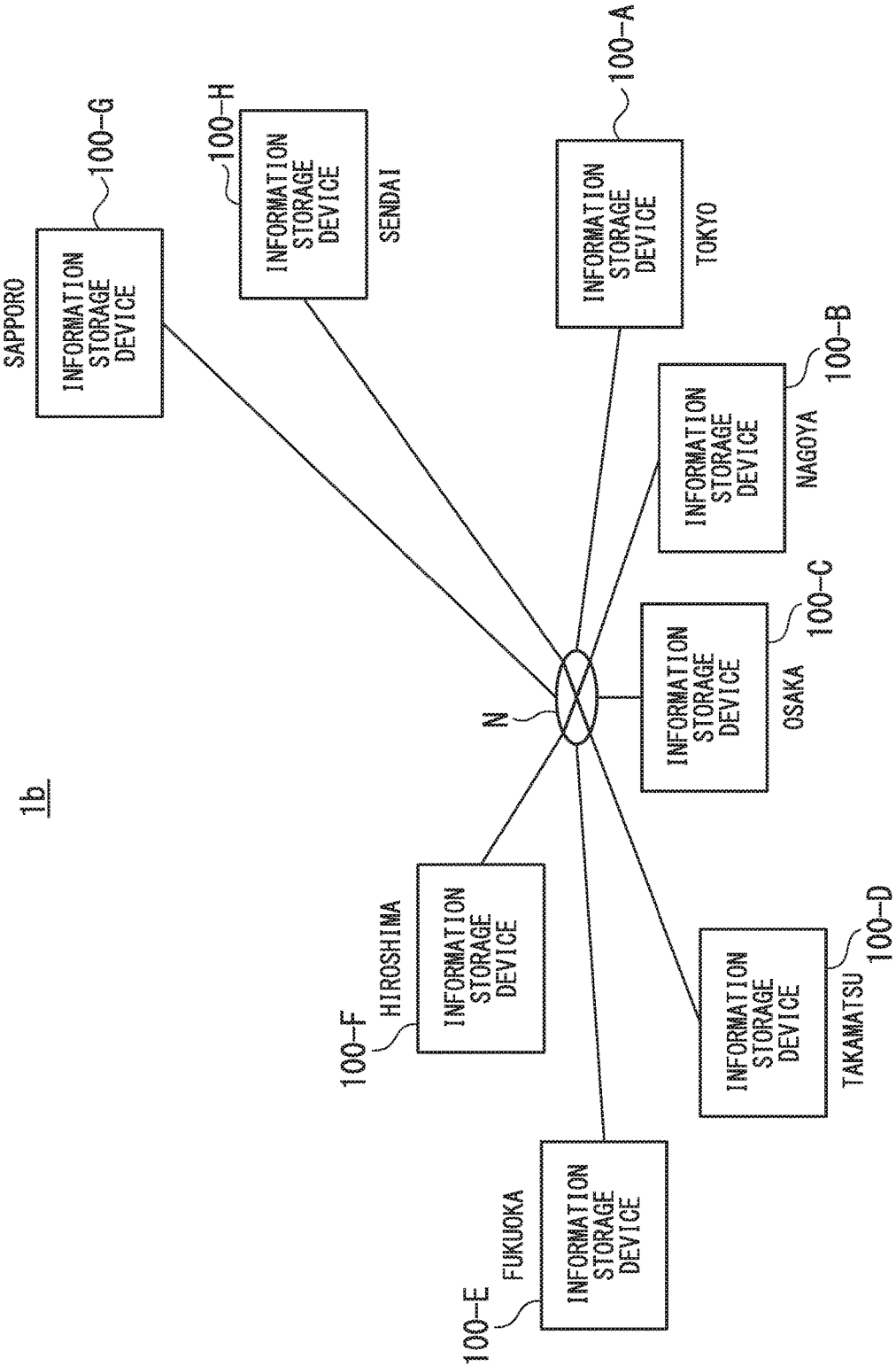
FIG. 11 is a schematic diagram illustrating an example of an information storage system which is a modification example of the embodiment.

FIG. 11 is a schematic diagram illustrating an example of an information storage system 1b that is a modification example of this embodiment. In this information storage system 1b, for example, information storage devices 100 (information storage devices 100-A to 100-H) are disposed in various places in Japan, and the information storage devices 100 are connected to one another over a network N. A case where the information storage system 1b is used for, for example, a company having a head office in Tokyo and respective branch offices in Osaka, Fukuoka, Hiroshima, and Sapporo and information of the Tokyo head office is divided and stored in the branch offices will be described. In this case, the division unit 160 divides the information of the information storage device 100-A disposed in the Tokyo head office into a plurality of pieces of information. In this example, the division unit 160 divides the information of the information storage device 100-A into three pieces of information. The information output unit 120 transmits first information among the divided pieces of information to the information storage device 100-C in the Osaka Branch. Further, the information output unit 120 transmits second information among the divided pieces of information to the information storage device 100-E in the Fukuoka branch office. By distributing and storing the information as above, the information storage system 1b can reduce the probability of information being lost due to failure or the like of the information storage devices 100.

In this information storage system 1b, the division unit 160 may divide the information of the own user stored in the first storage area 111 on the basis of the degree of association between the attribute of the other user and the attribute of the own user. A case in which the information of the Tokyo head office described above is divided and stored will be described by way of example. In this case, the own user is the above-described Tokyo head office, and the other users are each branch. Further, an attribute of the Tokyo head office and an attribute of each branch have a high degree of association in that both are a head and branch office of a company. In a case in which the degree of association between the attribute of another user and the attribute of the own user is high, the division unit 160 increases the number of divisions of information as compared to when the degree of association is low. In this specific example, when the division unit 160 divides information of the Tokyo head office, the division unit 160 divides the information into five pieces of information for the Tokyo head office and respective branches of Osaka, Fukuoka, Hiroshima, and Sapporo.

Further, a case in which information of the Osaka branch described above is divided and stored will be described by way of example.

In this case, the own user is the Osaka branch, and the other users are each branch other than the Tokyo head office and the Osaka branch. Here, the Osaka branch is closely associated with the Tokyo head office, but is less closely associated with other branches. When a degree of association between the attribute of the other users and the attribute of the own user is low, the division unit 160 decreases the number of divisions of information as compared to a case in which the degree of association is high. In this case, when the division unit 160 divides the information of the Osaka branch, the division unit 160 divides the information into two pieces of information for the Tokyo head office and the Osaka branch. Thus, the division unit 160 divides the information of the own user stored in the first storage area 111 on the basis of a degree of association between the attribute of the other users and the attribute of the own user. Here, when a degree of association between users is high, the importance of information may be higher than in a case in which a degree of association is low. When a degree of association between users is high, the division unit 160 increases the number of divisions of information. Accordingly, the information storage system 1b can reduce the probability of information being lost due to a failure of the information storage devices 100 or the like, according to the importance of the information.

In each embodiment and the modification example thereof described above, the information storage device 100 may include the privilege imparting unit 170. When a storage unit of the own device is caused to be used by another user, the privilege imparting unit 170 imparts a privilege to the own user. Further, the privilege imparting unit 170 imparts a lot of privilege to the own user when the amount of the storage unit of the own device caused to be used by the other user increases. That is, the privilege imparting unit 170 imparts a privilege to the own user on the basis of the amount of information that the information writing unit 130 stores in the second storage area 112. Here, the privilege is goods such as points on a point card, or any rights. By including the privilege imparting unit 170, it is possible to motivate causing a user to allow another user to use the storage unit of the own device.

Third Embodiment

Hereinafter, a third embodiment of the present invention will be described with reference to the accompanying drawings. The same configurations and operations as those in each embodiment described above are denoted with the same reference numerals, and description thereof will be simplified or omitted.

Figure 12:
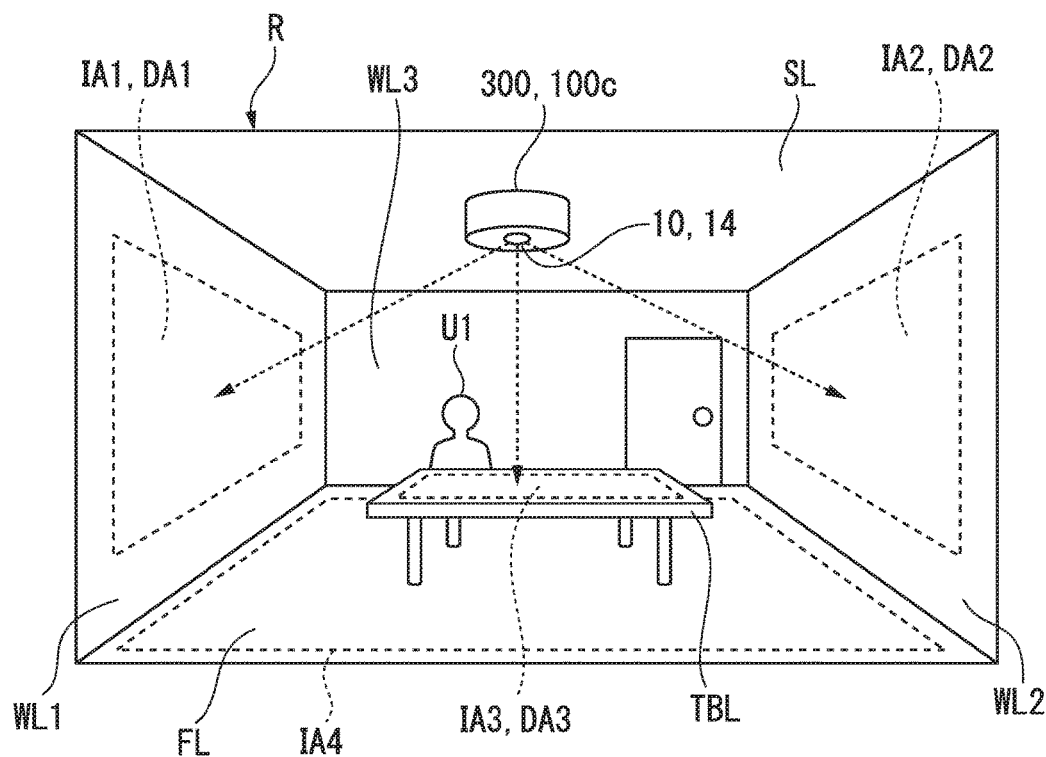
FIG. 12 is a schematic diagram illustrating an example of an information storage device according to a third embodiment.

FIG. 12 is a schematic diagram illustrating an example of an information storage device 100c according to the third embodiment. In this embodiment, the information storage device 100c is a storage device included in the electronic control device 300. Since a configuration of the information storage device 100c is the same as the configuration of the information storage device 100 described above, description thereof will be omitted. The electronic control device 300 is installed on a ceiling SL of a room R, as illustrated in FIG. 12. The electronic control device 300 includes an irradiation unit 14. The irradiation unit 14 functions as a projection device (projector) that generates an image by radiating light.

Specifically, the irradiation unit 14 displays an image in a display area DA of a surface in the room R by irradiating the display area DA with light. Examples of the display area DA include a display area DA1 which is set on a wall surface WL1 of the room R, a display area DA2 which is set on a wall surface WL2, and a display area DA3 which is set on an upper surface of a table TBL placed in the room R. In this example, the irradiation unit 14 displays an image by irradiating the display areas DA1 to DA3 with light. Thus, the electronic control device 300 displays an image inside the room R by the irradiation unit 14 irradiating the wall surface WL of the room R or the upper surface of the table TBL with light. Further, the electronic control device 300 can also change a state of the inside of the room R so that the state of the room R is switched, by changing the displayed image.

Here, a specific example of an image that the electronic control device 300 displays on, for example, a top surface of the table TBL of the room R will be described. Examples of the room R in which this electronic control device 300 is installed include a living room of a house, an office of a company, a classroom of a school, and a private room of a store (for example, a Karaoke booth). Here, a case in which the room R is a living room of a house of the user U1 will be described by way of example.

In this example, when this user U1 is a company employee, the electronic control device 300 displays an image of an office of a company in the display area DA. For example, when the user U1 is a company employee and is involved in a project (for example, project P1), the electronic control device 300 displays an image of a bookshelf in which materials for the project P1 are stored, in the display area DA1, and displays an image of a whiteboard in which sentences or graphics relating to the project P1 are drawn, in the display area DA2. Further, in this case, the electronic control device 300 displays an image of materials associated with the project P1 in the display area DA3. Thus, the user U1 can feel as if in the office of the company and can read the materials displayed on the table TBL. Further, since the electronic control device 300 includes the information storage device 100c, the electronic control device 300 can acquire information of materials of the project P1 from an information storage device (not illustrated) placed in the company. Thus, the user U1 can work as if the user had stayed in the office of the company while staying in the room R.

This electronic control device 300 includes an imaging unit 10, as illustrated in FIG. 12. This imaging unit 10 is, for example, a camera using a solid-state imaging element such as a charge coupled device (CCD) or a complementary metal oxide semiconductor (CMOS). This imaging unit 10 images an imaging area IA of a surface in the room R, and generates an image in the imaging area IA. Examples of the imaging area IA include an imaging area IA1 which is set on the wall surface WL1 of the room R, an imaging area IA2 which is set on the wall surface WL2, and an imaging area IA3 which is set on an upper surface of the table TBL placed in the room R, as illustrated in FIG. 12. Further, an example of the imaging area IA includes an imaging area IA4 that is set on a floor surface FL. In this example, the imaging unit 10 captures images of the imaging areas IA1 to IA4.

This electronic control device 300 provides the user with a function based on content of the image that is displayed in the display area DA. An object selection function that is an example of a function provided by the electronic control device 300 will be described in an example of a case in which an image of a bookcase in which the materials of the project P1 are stored is displayed in the display area DA1. If the user U1 moves the hand to touch an image of the materials of the bookshelf, the electronic control device 300 detects the operation of the user U1 and displays an image of the materials on the table TBL. Accordingly, if the user U1 performs an operation of selecting the materials, the electronic control device 300 can display an image of the selected materials as if the user U1 had taken the materials from the bookshelf and placed them on the table. Thus, the electronic control device 300 provides the object selection function of selecting an object such as the image of the materials and displaying an image of the selected object. Here, the image of the bookshelf and the image of the materials are examples of an interface image.

Further, a case in which an image of a whiteboard in which sentences or graphics relating to the project P1 are drawn is displayed in the display area DA2 with respect to a character input function which is an example of a function provided by the electronic control device 300 will be described by way of example. When the user U1 performs, for example, an operation of writing characters by tracing on the image of the whiteboard with a finger, the electronic control device 300 detects the operation of the user U1, superimposes the image of the written characters on the image of the whiteboard, and displays these. Specifically, the electronic control device 300 includes a storage unit (not illustrated) that associates a character code, shape information of a character (for example, vector data indicating an outline of the character), and font data for a display with one another and stores these. The electronic control device 300 performs image analysis on a trajectory of a finger of the user U1 on the basis of an image obtained by capturing the user U1. The electronic control device 300 performs pattern matching on result of the analysis and the shape information of the characters stored in advance to determine a character code of the characters written by the user U1. Then, the electronic control device 300 acquires the font data for a display associated with the determined character codes, superimposes an image based on the font data on the image of the whiteboard, and displays these. Accordingly, when the user performs an operation of writing characters by tracing on the image of the whiteboard with a finger, the electronic control device 300 can superimpose the image of the written characters on the image of the whiteboard and display the images as if the user U1 has written the characters on the whiteboard. Thus, the electronic control device 300 provides a character input function of recognizing characters on the basis of a trajectory of a finger. Here, the image of the characters and the image of the whiteboard are examples of an interface image. Hereinafter, a configuration of the electronic control device 300 will be described.

<Regarding Electronic Control Device 300>

Figure 13:
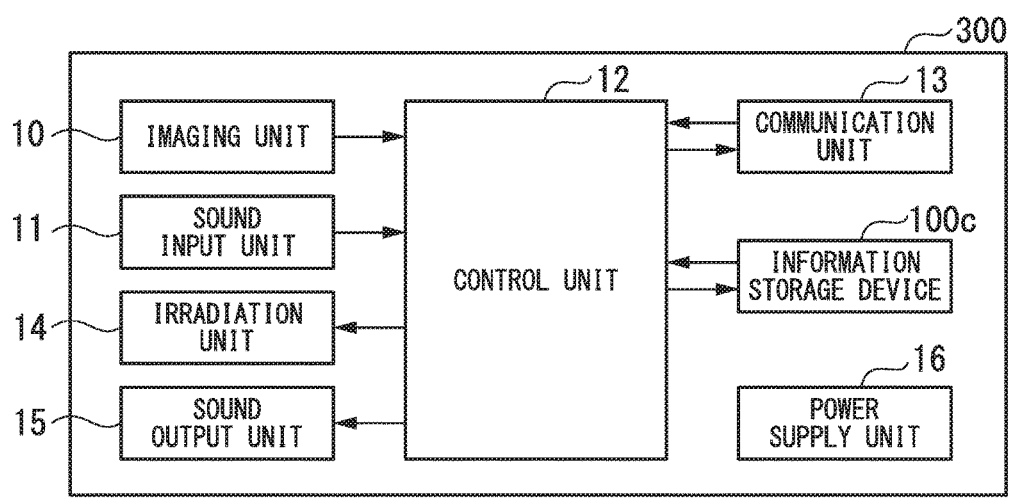
FIG. 13 is a schematic block diagram illustrating a configuration of an electronic control device according to this embodiment.

FIG. 13 is a schematic block diagram illustrating a configuration of the electronic control device 300 of this embodiment. As illustrated in FIG. 13, the electronic control device 300 includes an imaging unit 10, a sound input unit 11, a communication unit 13, an irradiation unit 14, a sound output unit 15, a power supply unit 16, a control unit 12, and an information storage device 100c.

The imaging unit 10 includes, for example, a camera, and images a real space and outputs a captured image to the control unit 12. That is, the imaging unit 10 captures an image of the real space. Here, the real space is a space having a surface with a certain size, and is a real space with respect to a virtual space. This real space includes an open space such as an outdoor plaza, and a closed space such as an indoor facility. Further, the surface with a certain area is a display surface on which an image can be displayed. This surface includes a two-dimensional plane or a three-dimensional curved surface. Here, the real space is inside a room R.

Further, this imaging unit 10 is capable of imaging using a frequency region other than visible light, in addition to imaging using visible light. For example, the imaging unit 10 may be capable of imaging using wavelengths in an infrared region or an ultraviolet region. A case in which this imaging unit 10 is capable of imaging using infrared rays in addition to visible light will be hereinafter described.

The information storage device 100c includes a nonvolatile storage device such as a hard disk drive (HDD) or a flash memory and a volatile memory device such as a static RAM (SRAM) or a dynamic RAM (DRAM). A calculation result of the control unit 12 is temporarily stored in this information storage device 100c. Further, image information indicating an image from the light irradiated by the irradiation unit 14 is stored in the information storage device 100c. Details of the image information stored in the information storage device 100c will be described below.

The sound input unit 11 includes, for example, a microphone, and receives ambient sound, converts the ambient sound into data, and outputs the converted data to the control unit 12.

The communication unit 13 communicates with other devices in a wired or wireless manner.

The sound output unit 15 includes, for example, a speaker, and outputs sound on the basis of control of the control unit 12. The sound output unit 15 may include a directional speaker. In this case, the sound output unit 15 outputs sound having predetermined directivity characteristics.

The power supply unit 16 acquires power from an internal or external power supply, and supplies the acquired power to each unit of the electronic control device 300. The power supply unit 16 acquires power, for example, via an outlet installed in the wall surface WL of the room R or a lighting fixture mounting socket installed on the ceiling SL.

The irradiation unit 14 includes, for example, a projector, and radiates light on the basis of control of the control unit 12. As described below, the control unit 12 acquires various types of image information stored in the information storage device 100c, and supplies the acquired image information to the irradiation unit 14. The irradiation unit 14 irradiates a real space with light based on the image information supplied from the control unit 12 so that an image is displayed. In this case, the irradiation unit 14 radiates light according to an irradiation state based on the shape of an irradiation prohibition area IH detected by the detection unit 103 of the control unit 12. Details of a mechanism in which this irradiation unit 14 radiates the light according to the irradiation state based on the shape of the irradiation prohibition area IH detected by the detection unit 103 will be described below.

The imaging unit 10 and the irradiation unit 14 described above may be formed integrally (see FIG. 13).

Further, the irradiation unit 14 can perform irradiation with a frequency region other than visible light, in addition to irradiation with visible light. For example, the irradiation unit 14 can perform irradiation with wavelengths in an infrared region or an ultraviolet region. Hereinafter, a case in which the irradiation unit 14 can perform irradiation with infrared rays in addition to visible light will be described.

<Configuration of Control Unit 12>

The control unit 12 includes, for example, a central processing unit (CPU). The control unit 12 performs information processing on the basis of data input from the imaging unit 10 and the sound input unit 11. For example, the control unit 12 performs a character recognition process of recognizing characters included in the image captured by the imaging unit 10 or a pattern matching process of recognizing a user included in the image captured by the imaging unit 10. Further, the control unit 12 performs communication with other devices via the communication unit 13 and performs information processing on the basis of information acquired through communication. The control unit 12 controls the irradiation unit 14 and the sound output unit 15 on the basis of a result of the processing.

As described above, the electronic control device 300 includes the irradiation unit 14 that displays an image by irradiating a surface in a space with light. Thus, it is possible to display the image on a variety of surfaces such as a wall surface, a floor surface, or a ceiling surface in a space such as the room R. For example, when an image of an office of a company is displayed in a case in which the electronic control device 300 is installed in a living room of a house, the living room of the house is instantaneously state-switched to the office of the company. That is, according to the electronic control device 300, since the state switching in a space can be instantaneously performed, it is possible to provide an image desired by the user.

Further, in the electronic control device 300, the information storage device 100c may acquire image information from another information storage device over the network. Accordingly, the electronic control device 300 can switch between and provide types of space to be reproduced. For example, according to the electronic control device 300, it is possible to reproduce a state of an office of a company when the user performs work and to reproduce a state of a restaurant when the user has meals. That is, according to the electronic control device 300, the user can use one space for a variety of applications.

The control unit 12 may be integrally formed with the optical system of the imaging unit 10 and the optical system of the irradiation unit 14 which are formed as a common system (an integrally formed device is referred to as an integral imaging and irradiation device). For example, the control unit 12 may match an optical axis of the imaging unit 10 with an optical axis of the irradiation unit 14.

In this case, in the integral imaging and irradiation device, since the optical axes of irradiation and imaging are the same, the control unit 12 can recognize an irradiated spot in the captured image with the same optical axis as it is. Thus, it is possible to facilitate adjustment of a spot. Further, in the integral imaging and irradiation device, since the optical systems are formed as a common system, it is possible to save space and reduce costs as compared with a case in which the optical systems are not formed as a common system. Further, since the light is radiated from the optical system, the user may hardly notice that the user is imaged.

Thus, the user can use the electronic control device 300 without being aware that the user is imaged by the camera.

The integral imaging and irradiation device may have a function of realizing independent focusing in the irradiation and the imaging. For example, in the integral imaging and irradiation device, a movable lens may be provided on an optical path between an optical unit and an irradiation light generation unit. Further, in the integral imaging and irradiation device, the movable lens may be provided on an optical path between the optical portion and a solid-state imaging unit, or the solid-state imaging unit may be configured to be movable.

Thus, the integral imaging and irradiation device can realize focusing in the irradiation and the imaging.

The optical unit may be, for example, a fish-eye lens. Thus, the electronic control device 300 can perform irradiation in a wide range and can perform imaging in a wide range.

The case in which the electronic control device 300 is installed on the ceiling SL of the room R has been described as a specific example, but the present invention is not limited thereto. For example, the electronic control device 300 may be installed on, for example, the wall surface WL (for example, a wall surface WL3) of the room R or the upper surface of the table TBL.

Further, the imaging areas IA1 to IA4 have been described as an example of the display area IA, but the present invention is not limited thereto. The ceiling SL, another wall surface WL (not illustrated) in the room R, or an object (not illustrated) in the room R may be the imaging area IA.

Further, the display areas DA1 to DA3 have been described as an example of the display area DA, but the present invention is not limited thereto. The ceiling SL, another wall surface WL (not illustrated) in the room R, or an object (not illustrated) in the room R may be the display area DA.

Some units of the information storage device 100 and the electronic control device 300 (hereinafter, these devices are collectively simply referred to as a device) in the above-described embodiment may be realized by a computer. In this case, the units may be realized by recording a program for realizing a control function thereof on a computer-readable recording medium, loading the program recorded on the recording medium into a computer system, and executing the program. Here, the "computer system" is a computer system that is built into the device and includes an OS (Operating System) or hardware such as a peripheral device. Further, the "computer-readable recording medium" refers to a portable medium such as a flexible disk, a magneto-optical disc, a ROM, or a CD-ROM, or a storage device such as a hard disk embedded in the computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in a combination with a program previously stored in the computer system. Further, some or all of the device in the above-described embodiment may be realized as an integrated circuit such as a large scale integration (LSI). Each functional block of the device may be individually configured as a processor, or some or all thereof may be integrated and configured as a processor. Further, an integrated circuit scheme is not limited to the LSI and the block may be realized as a dedicated circuit or a general-purpose processor. Further, in a case in which an integrated circuit technology with which the LSI is replaced appears with the advance of a semiconductor technology, an integrated circuit according to the technology may be used.

Although the embodiments of the present invention have been described above in detail with reference to the drawings, specific configurations are not limited to those described above and various design modifications can be performed without departing from the gist of the present invention.

What is claimed is:

1. An information storage device that is used by a user and communicates over a network with another device, different from the information storage device, that is used by another user different from the user, the information storage device comprising:
   a storage unit including a first storage area available to the user of the information storage device and a second storage area available to the other user of the other device;
   an information output unit that outputs information of the user stored in the first storage area to the other device over the network;
   an information writing unit that stores information of the other user output by the other device over the network, in the second storage area; and
   a use control unit that controls whether the second storage area is available to the user of the information storage device on the basis of an instruction of the other user of the other device.

2. The information storage device according to claim 1, further comprising:
   a selection unit that selects the other device to be an output destination of the information of the user from among a plurality of other devices on the basis of an attribute of the other user and an attribute of the user,
   wherein the information output unit outputs the information of the user stored in the first storage area to the other device selected by the selection unit over the network.

3. The information storage device according to claim 2,
   wherein the plurality of other devices are divided into a plurality of device groups in advance on the basis of respective attributes of the users of the plurality of other devices and the attribute of the user,
   the selection unit selects a device group to be an output destination of the information of the user from among the device groups on the basis of the attributes of the users of the plurality of other devices and the attribute of the user, and
   the information output unit outputs the information of the user stored in the first storage area to the other devices included in the device group selected by the selection unit over the network.

4. The information storage device according to claim 2,
   wherein the plurality of other devices are divided into a plurality of device groups in advance on the basis of a degree of association between respective attributes of the users of the plurality of other devices and the attribute of the user, the degree of association being determined by different rankings of importance among different types of relationship between the user and the users of the plurality of other devices, and the selection unit selects a device group to be an output destination of the information of the user from among the device groups on the basis of the degree of association between the attributes of the users of the plurality of other devices and the attribute of the user.

5. The information storage device according to claim 4, wherein the selection unit selects a device group in which the degree of association is high, as a device group of an output destination of information of the user.

6. The information storage device according to claim 1, further comprising:
   a division unit that divides the information of the user stored in the first storage area into a plurality of information groups,
   wherein the information output unit outputs the divided information groups to a plurality of other devices over the network.

7. The information storage device according to claim 6, wherein the division unit divides information of the user stored in the first storage area on the basis of a degree of association between respective attributes of the users of the plurality of other devices and the attribute of the user, the degree of association being determined by different rankings of importance among different types of relationship between the user and the users of the plurality of other devices.

8. The information storage device according to claim 1, further comprising:
   a privilege imparting unit that imparts a privilege to the user on the basis of an amount of information that the information writing unit stores in the second storage area, the privilege granting rights to the user.

9. An information storage system in which a first device used by a first user and a second device, different from the first device, used by a second user different from the first user communicate over a network,
   wherein the first device includes
   a first storage unit including a first storage area available to the first user of the first device and a second storage area available to the second user of the second device;
   a first information output unit that outputs the information of the first user stored in the first storage area to the second device over the network;
   a first information writing unit that stores information of the second user output by the second device over the network, in the second storage area; and
   a use control unit that controls whether the second storage area is available to the first user of the first device on the basis of an instruction of the second user of the second device, and
   the second device includes
   a second storage unit including a third storage area available to the second user of the second device and a fourth storage area available to the first user of the first device;
   a second information output unit that outputs information of the second user stored in the third storage area to the first device over the network; and
   a second information writing unit that stores information of the first user output by the first device over the network, in the fourth storage area.

10. An information storage control method that causes a computer included in a device used by a user, comprising a storage unit including a first storage area available to the user and a second storage area available to another user different from the user, and communicating with another device, different from the device, used by the other user over a network to execute:
    an information output step of outputting information of the user stored in the first storage area to the other device over the network;
    an information writing step of storing information of the other user output by the other device over the network, in the second storage area; and
    a use control step of controlling whether the second storage area is available to the user of the device on the basis of an instruction of the other user of the other device.

* * * * *